US009484743B2

(12) United States Patent
San Andres et al.

(10) Patent No.: US 9,484,743 B2
(45) Date of Patent: Nov. 1, 2016

(54) POWER DISTRIBUTION NETWORK EVENT ANALYSIS USING DATA FROM DIFFERENT DATA SOURCES

(75) Inventors: Ramon Juan San Andres, Duluth, GA (US); Kamal Kumar Arvind, Atlanta, GA (US); Vernon Meadows, Lilburn, GA (US); Atul Nigam, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 495 days.

(21) Appl. No.: 13/398,188

(22) Filed: Feb. 16, 2012

(65) Prior Publication Data

US 2013/0218353 A1   Aug. 22, 2013

(51) Int. Cl.
*G05D 17/00* (2006.01)
*H02J 1/10* (2006.01)
*H02J 13/00* (2006.01)

(52) U.S. Cl.
CPC .............. *H02J 1/10* (2013.01); *H02J 13/0003* (2013.01); *Y02B 90/228* (2013.01); *Y04S 20/18* (2013.01)

(58) Field of Classification Search
USPC ........................................................ 700/286
See application file for complete search history.

(56) References Cited

U.S. PATENT DOCUMENTS

| 7,729,808 | B2 | 6/2010 | Nasle et al. | |
|---|---|---|---|---|
| 7,979,222 | B2 | 7/2011 | Donde et al. | |
| 8,036,872 | B2 | 10/2011 | Nasle | |
| 8,321,194 | B2 | 11/2012 | Meagher et al. | |
| 8,595,094 | B1 | 11/2013 | Forbes, Jr. | |
| 8,706,309 | B2 | 4/2014 | Schweitzer, III et al. | |
| 8,793,202 | B2 | 7/2014 | Wang et al. | |
| 2004/0225648 | A1* | 11/2004 | Ransom et al. | 707/3 |
| 2005/0090995 | A1* | 4/2005 | Sonderegger | 702/57 |
| 2009/0216910 | A1* | 8/2009 | Duchesneau | 709/250 |
| 2010/0235285 | A1* | 9/2010 | Hoffberg | 705/75 |
| 2010/0317420 | A1* | 12/2010 | Hoffberg | 463/1 |
| 2011/0016342 | A1* | 1/2011 | Rowan et al. | 713/340 |
| 2011/0204720 | A1* | 8/2011 | Ruiz et al. | 307/66 |
| 2011/0219208 | A1* | 9/2011 | Asaad et al. | 712/12 |
| 2012/0109545 | A1* | 5/2012 | Meynardi et al. | 702/58 |
| 2012/0253539 | A1 | 10/2012 | McMullin | |
| 2012/0323389 | A1 | 12/2012 | Shelton et al. | |
| 2013/0110298 | A1 | 5/2013 | Beveridge | |

* cited by examiner

*Primary Examiner* — Mohammad Ali
*Assistant Examiner* — Bernard G Lindsay
(74) *Attorney, Agent, or Firm* — Sutherland Asbill & Brennan LLP

(57) ABSTRACT

A method for power distribution network analysis includes receiving power distribution network event data from a plurality of data sources, filtering the power distribution network event data, normalizing the power distribution network event data, storing the power distribution network event data in an event database and retrieving, in a querying engine, the power distribution network event data.

18 Claims, 3 Drawing Sheets

POWER DISTRIBUTION NETWORK EVENT ANALYSIS USING DATA FROM DIFFERENT DATA SOURCES

BACKGROUND OF THE INVENTION

The subject matter disclosed herein relates to power distribution networks, and more particularly to systems and methods for capturing, analyzing and replaying power distribution network events.

Power distribution networks can experience several events that include corresponding data from a variety of sources. For example, if there is a blackout in a power distribution network, there may be several corresponding pieces of data such as weather data showing that there was increased electrical storm activity, data from an electrical grid showing that several power transformers broke down, and media data showing that there were several conventions in the area thus increasing power demand on the power distribution network. Often, these data sources are in a variety of formats that have to be individually collected. Manual correlations are then made to make a determination of what data sources contributed to the power distribution network event.

BRIEF DESCRIPTION OF THE INVENTION

According to one aspect of the invention, a method for power distribution network analysis is described. The method includes receiving power distribution network event data from a plurality of data sources, filtering the power distribution network event data, normalizing the power distribution network event data, storing the power distribution network event data in an event database and retrieving, in a querying engine, the power distribution network event data.

According to another aspect of the invention, a computer program product including a non-transitory computer readable medium storing instructions for causing a computer to implement a method for power distribution network analysis is described. The method includes receiving power distribution network event data from a plurality of data sources, filtering the power distribution network event data, normalizing the power distribution network event data, storing the power distribution network event data in an event database and retrieving, in a querying engine, the power distribution network event data.

According to yet another aspect of the invention, a system for power distribution network analysis is described. The system includes a querying engine, an event database communicatively coupled to the querying engine, a normalization layer coupled to the event database and configured to transform a plurality of data structure types to a single data structure type and a plurality of event filters coupled to the normalization layer and configured to retrieve relevant power distribution network event data from a plurality of data sources.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
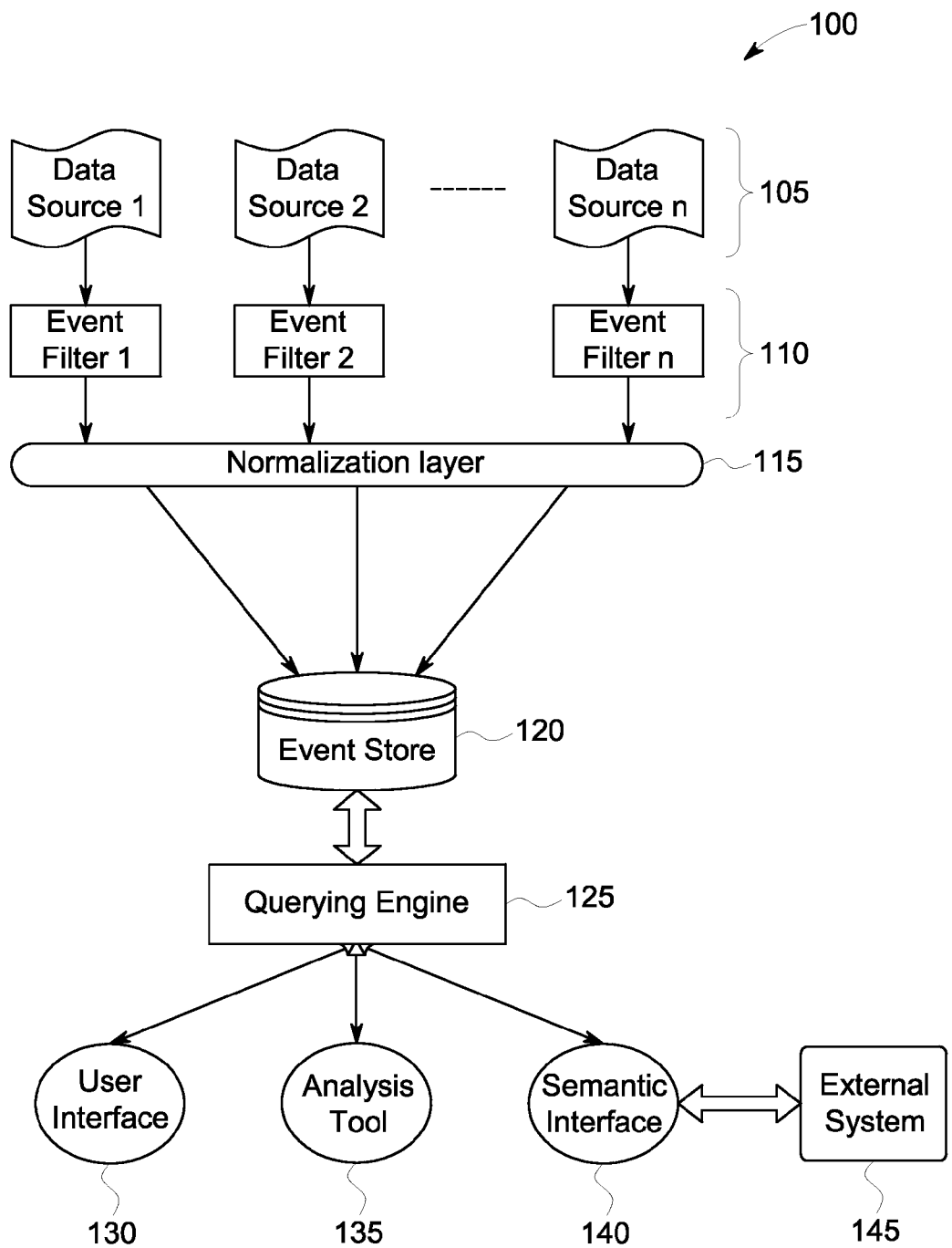
FIG. 1 diagrammatically illustrates an exemplary system for power distribution network event analysis.

FIG. 1 diagrammatically illustrates an exemplary system 100 for power distribution network event analysis. The system 100 includes a variety of data sources 105. The data sources 105 are potentially unlimited. However, typical sources include power distribution network data, weather data (e.g., temperature, wind direction and speed, barometric pressure), space weather data (e.g., solar flares), catastrophe data (e.g., earthquake information), media data and the like. It will be appreciated that the systems and methods described herein contemplate receiving any data source with any format, which can be related to power distribution network events. Power distribution events include but are not limited to: blackouts, switch states (i.e., open/close), and load values that exceed a predetermined threshold value. In exemplary embodiments, the power distribution network can be any electrical distribution system for the delivery of electricity to consumers. As such, the power distribution network can include, but is not limited to, power generation plants, transmission lines, transformers, substations, demand centers and the like. The input data from the data sources 105 may also come from different power distribution systems, so the analytical capabilities of the system 100 go beyond the analysis of events within a single power distribution network, being able to correlate events across power distribution networks. Additionally, event correlation is performed based on any number of different parameters beyond time.

The system 100 further includes event filters 110 for each of the data sources 105. The event filters 110 are configured to select events in the power distribution network that may be beyond certain predetermined thresholds. In exemplary embodiments, the event filters 110 are aware of the normal (predetermined) range of input values at a particular point in time (e.g., temperature values for a particular place at a particular time of the year). Depending on the input data source 105, the corresponding event filter 110 may be more elaborate. For example, the event filter 110 can apply rules-based processing, patterns-based analysis, Bayesian analysis and the like. The event filter 110 may also be more generic such as a neural network-based filter.

The system 100 can further include a normalization layer 115 coupled to the event filters 110 and configured to receive all of the data from the data sources 105 and correspondingly filtered by the event filters 110. The normalization layer 115 is configured to transform the various data types into a single data format that can then be stored in an event database (event store) 120. As such, the normalization layer 115 can be a dynamically updated layer that is adaptable to any data (structure) type. It will be appreciated that the normalization layer 115 can be initially programmed to convert various known data types from the data sources 105. As new data sources are identified, the normalization layer 115 can be appropriately updated to receive and convert the new data type to the normalized data type that is stored in the event database 120. As such, the system 100 consumes vast amounts of data and data types from a multitude of sources that identify power distribution network events represented by data that falls out of the "normal" range, and stores those events in the event database 120.

The system 100 further includes a querying engine 125 coupled to the event database 120 and configured to extract the normalized data from the event database 120. In exemplary embodiments, the querying engine 125 is configured to access information such as but not limited to: data values and ranges; events similar to a particular current event; and time data. With regard to data values and ranges, the querying engine 125 can be implemented to retrieve all data values and ranges for all of the data sources 105 related to a particular power distribution network event or a particular point in time. In addition, as the event database 120 grows and evolves, it can keep a history of power distribution network events and the data related to those historic power distribution network events. As such, the querying engine 125 can be implemented to retrieve events that are similar to a particular event. For example, events that are surrounded by a set of input data from the data sources 105 that matches a particular event are given matching criteria. In this way, a user can input criteria into the querying engine 125 in order to retrieve historic events. The user can then use this retrieved data to analyze a current event that is similar to the historic event and thereby save time and effort in figuring out how to manage the current event. For example, if there is going to be a large city-wide convention in a given area, a user can query the event database 120 to determine if there was a similar city-wide convention, and any resulting power distribution network events that occurred during the convention. In this way, the user can take action or preemptive measures to avoid a similar power distribution network event. The querying engine 125 is also configured to retrieve all input (time) data (or ranges) for all time points (given a certain granularity) for a particular time period. In this way, a user can analyze a given time period and corresponding data from the data sources 105 during the given time period.

In exemplary embodiments, the querying engine 125 can be coupled to various interfaces in order to access the event database 120 for analysis. For example, a user interface 130 can be coupled to the querying engine 125 to provide basic querying functionality in order to query the event database 120. The querying engine 125 can include various types of analysis tools 135, which can be various software interfaces, for example, to obtain system state information surrounding any particular event or any particular point in time. The analysis tools 135 can therefore enable the querying engine 125 to use advanced analysis applications to perform root-cause analyses of events, to perform correlation analyses, to generate prediction models, to drive simulations, to rerun events, to be the source of semantic-based queries and the like. A semantic interface 140 can also be coupled to the querying engine 125. The semantic interface 140 can be any layered, open architecture providing device-independent access to the event database 120. As such, any suitable external system 145 can be used, such as but not limited to computing devices, mobile devices, smart devices and the like. The various interfaces described herein, which are only illustrative and can include various other interfaces, provide visualization and analysis of all circumstances surrounding a particular power distribution network event. The system 100 therefore enables sophisticated forensic analysis of power distribution network events, which allows root-cause analyses, prediction models and power distribution network planning.

Figure 2:
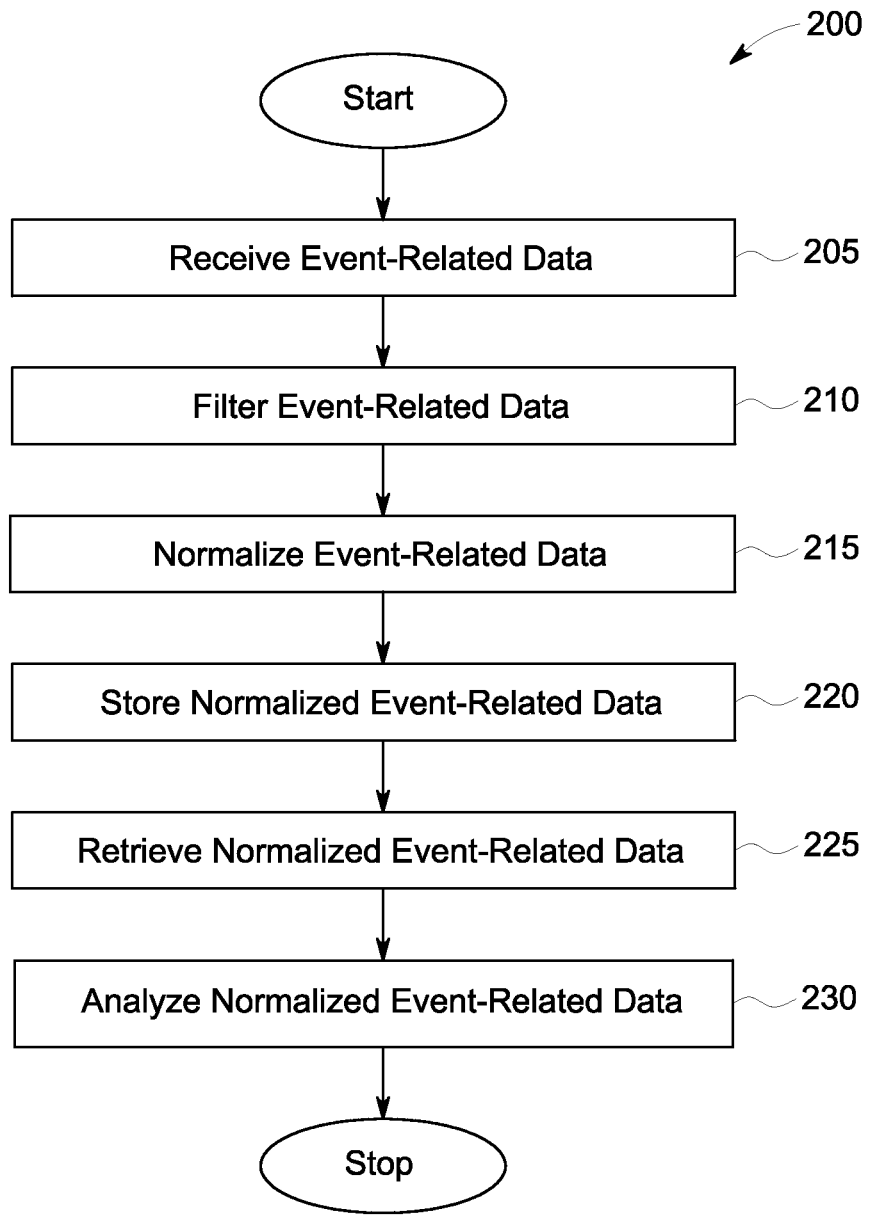
FIG. 2 illustrates a method for a power distribution network analysis in accordance with exemplary embodiments.

FIG. 2 illustrates a method 200 for power distribution network analysis in accordance with exemplary embodiments. At block 205, the system receives event-related data from the data sources 105. At block 210, the event filters 110 filter the event-related data to retrieve the relevant data for power distribution network events. At block 215, the relevant power distribution network event data is normalized at the normalization layer 115 as described herein. At block 220, the normalized relevant data for power distribution network events is stored in the event database 120 as described herein. At block 225, the data stored in the event database 120 is retrieved by the querying engine 125 for dissemination to a variety of interfaces. As described herein, the data from the event database can be retrieved via a variety of interfaces. In addition, at block 230, the data from the event database 120 can be analyzed and processed in a variety of ways as described herein.

Figure 3:
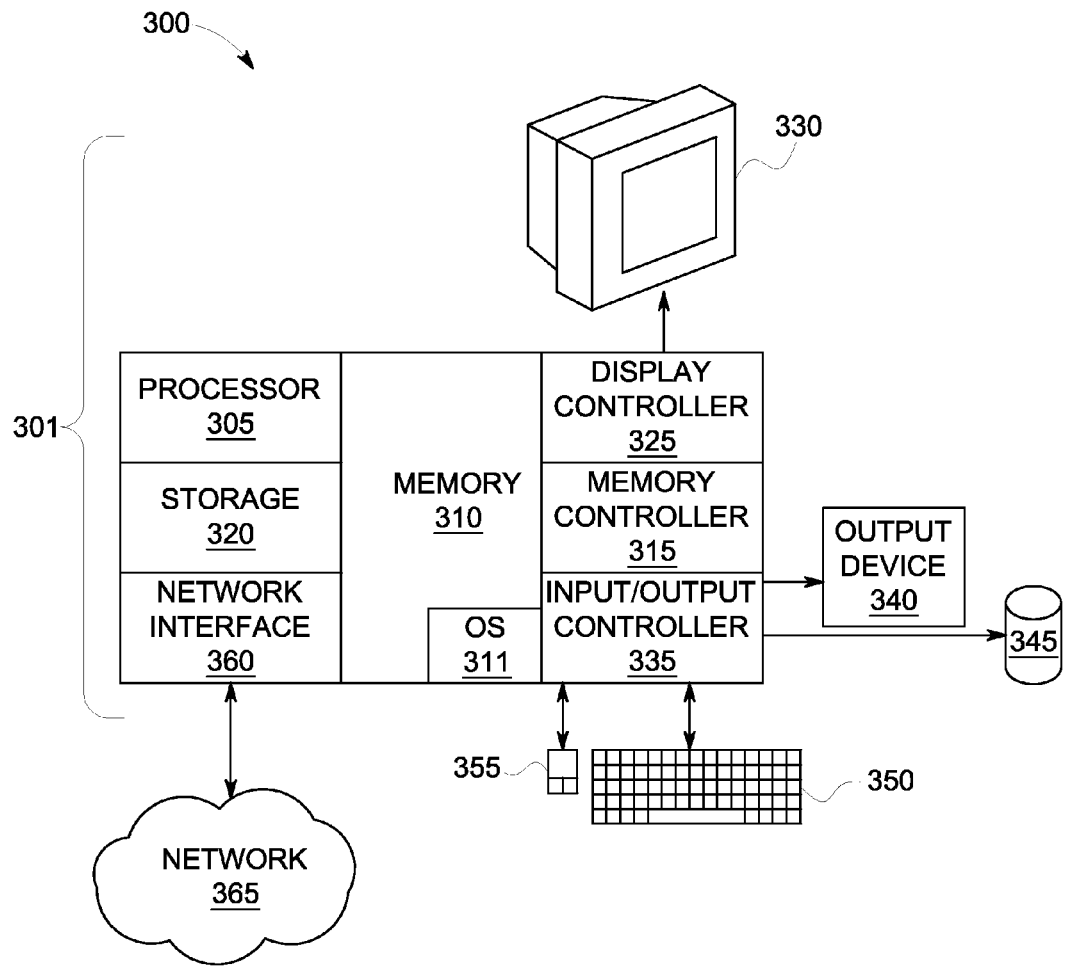
FIG. 3 illustrates an exemplary embodiment of a system that can be implemented for analyzing power distribution network events as described herein.

The querying engine 125 and the external system 145 described herein can implement any suitable computing device as now described. FIG. 3 illustrates an exemplary embodiment of a system 300 that can be implemented for analyzing power distribution network events as described herein. The methods described herein can be implemented in software (e.g., firmware), hardware, or a combination thereof. In exemplary embodiments, the methods described herein are implemented in software, as an executable program, and are executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, a memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in the memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or a combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in the memory 310 may include one or more separate programs, each of which comprises an ordered listing of executable instructions for implementing logical functions. In the example of FIG. 3, the software in the memory 310 includes the power distribution network event analysis methods described herein in accordance with exemplary embodiments and a suitable operating system (OS) 311. The OS 311 essentially controls the execution of other computer programs, such as the power distribution network event analysis systems and methods as described herein, and provides scheduling, input-output control, file and data management, memory management, and communication control and related services.

The power distribution network event analysis methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the power distribution network event analysis methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, such as but not limited to a printer, a scanner, a microphone, and the like. Finally, the I/O devices 340, 345 may further include devices that communicate both inputs and outputs, such as but not limited to a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and the external systems. In exemplary embodiments, the network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN), a personal area network (PAN), a virtual private network (VPN), an intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The power distribution network event analysis methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the power distribution network event analysis methods are implemented in hardware, the power distribution network event analysis methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include providing a single normalized source of information for visualization and analysis tools.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for power distribution network analysis, the method comprising:
    receiving power distribution network data, space weather data, media data, and weather data from a plurality of data sources, wherein a data structure type generated at one of the plurality of data sources is different than a data structure type generated at another of the plurality of data sources, the media data being associated with at least one area-wide convention, wherein the at least one area-wide convention historically resulting in a power distribution network event;
    filtering the power distribution network data to provide power distribution network event data that falls outside of a threshold;
    filtering the weather data to provide weather event data that falls outside of a predetermined range of values;
    filtering the space weather data to provide space weather event data that falls outside of the predetermined range of values;
    filtering the media data to provide media data event data that falls outside of the predetermined range of values;
    normalizing the power distribution network event data, the space weather event data, the media event data, and the weather event data to transform the data structure types from the plurality of data sources to a single data structure type for the plurality of data sources;
    storing the power distribution network event data in an event database; and
    retrieving, in a querying engine, the power distribution network event data, the space weather event data, the media event data, and the weather event data using a query related to a current event; and
    analyzing the retrieved power distribution network event data, the space weather event data, the media event data, and the weather event data to manage the current event.

2. The method as claimed in claim 1 wherein the power distribution network event data retrieved by the querying engine is disseminated to a plurality of interfaces.

3. The method as claimed in claim 1 wherein the power distribution network event data retrieved by the querying engine is disseminated to a plurality of analysis tools.

4. The method as claimed in claim 1 wherein the querying engine is configured to retrieve data values and ranges for the power distribution network event data related to a particular power distribution network event.

5. The method as claimed in claim 1 wherein the querying engine is configured to retrieve data related to historic power distribution network events matching criteria related to a particular power distribution network event.

6. The method as claimed in claim 1 wherein the querying engine is configured to retrieve time data for a time period related to a particular power distribution network event.

7. The method as claimed in claim 1 wherein the power distribution network event data is filtered to retrieve relevant data that contributes to power distribution network events.

8. A computer program product including a non-transitory computer readable medium storing instructions for causing a computer to implement a method for power distribution network analysis, the method comprising:
receiving power distribution network data, space weather data, media data, and weather data from a plurality of data sources, wherein a data structure generated at one of the plurality of data sources is different than a data structure type generated at another of the plurality of data sources, the media data being associated with at least one area-wide convention, wherein the at least one area-wide convention historically resulted in a power distribution network event;
filtering the power distribution network event data to provide power distribution network event data that falls outside of a threshold;
filtering the weather data to provide weather event data that falls outside of a predetermined range of values;
filtering the space weather data to provide space weather event data that falls outside of the predetermined range of values;
filtering the media data to provide media data event data that falls outside of the predetermined range of values;
normalizing the power distribution network event data, the space weather event data, the media event data, and the weather data to transform the data structure types from the plurality of data sources to a single data structure type;
storing the power distribution network event data in an event database;
retrieving, in a querying engine, the power distribution network event data, the space weather event data, the media event data, and the weather event data using a query related to a current event; and
analyzing the retrieved power distribution network event data, the space weather event data, the media event data, and the weather event data to manage the current event.

9. The computer program product as claimed in claim 8 wherein the power distribution network event data retrieved by the querying engine is disseminated to a plurality of interfaces.

10. The computer program product as claimed in claim 8 wherein the power distribution network event data retrieved by the querying engine is disseminated to a plurality of analysis tools.

11. The computer program product as claimed in claim 8 wherein the querying engine is configured to retrieve data values and ranges for the power distribution network event data related to a particular power distribution network event.

12. The computer program product as claimed in claim 8 wherein the querying engine is configured to retrieve data related to historic power distribution network events matching criteria related to a particular power distribution network event.

13. The computer program product as claimed in claim 8 wherein the querying engine is configured to retrieve time data for a time period related to a particular power distribution network event.

14. The computer program product as claimed in claim 8 wherein the power distribution network event data is filtered to retrieve relevant data that contributes to power distribution network events.

15. A system for power distribution network analysis, the system comprising:
a querying engine;
an event database communicatively coupled to the querying engine configured to store data power distribution network data, space weather data, media data, and weather data from a plurality of data sources, wherein a data structure generated at one of the plurality of data sources is different than a data structure type generated at another of the plurality of data sources, the media data being associated with at least one area-wide convention, wherein the at least one area-wide convention historically resulted in a power distribution network event;
a normalization layer coupled to the event database and configured to transform the plurality of data structure types from the plurality of data sources to a single data structure type for the plurality of data sources;
a plurality of event filters coupled to the normalization layer and configured to retrieve relevant power distribution network data, relevant space weather data, relevant media data, and relevant weather data, filter the power distribution network data to provide power distribution network event data that falls outside of a threshold, filter the weather data to provide weather event data that falls outside of a predetermined range of values, filter the space weather data to provide space weather event data that falls outside of the predetermined range of values, and filter the media data to provide media data event data that falls outside of the predetermined range of values;
wherein the querying engine retrieves the power distribution network event data, the space weather event data, the media event data, and the weather event data using a query related to a current event in order to analyze the retrieved power distribution network event data and the weather event data to manage the current event.

16. The system as claimed in claim 15, wherein the querying engine is configured to retrieve data values and ranges for the power distribution network event data related to a particular power distribution network event.

17. The system as claimed in claim 15, wherein the querying engine is configured to retrieve data related to historic power distribution network events matching criteria related to a particular power distribution network event.

18. The system as claimed in claim 15, wherein the querying engine is configured to retrieve time data for a time period related to a particular power distribution network event.

* * * * *